United States Patent [11] 3,604,760

| | | | | |
|---|---|---|---|---|
| [72] | Inventor | Thomas M. Atkins<br>Ann Arbor, Mich. | | |
| [21] | Appl. No. | 809,543 | | |
| [22] | Filed | Mar. 24, 1969 | | |
| [45] | Patented | Sept. 14, 1971 | | |
| [73] | Assignee | Kelsey-Hayes Company<br>Romulus, Mich. | | |

[54] SKID CONTROL SYSTEM
12 Claims, 3 Drawing Figs.

[52] U.S. Cl. .................................................. 303/21 CG,
188/181 A
[51] Int. Cl. ..................................................... B60t 8/06
[50] Field of Search ........................................... 303/21, 24,
6, 61–63, 68–69; 188/181; 73/492, 488; 324/73,
73 A

[56] References Cited
UNITED STATES PATENTS

| | | | |
|---|---|---|---|
| 3,233,946 | 2/1966 | Lockhart ...................... | 303/21 |
| 3,301,608 | 1/1967 | Harned et al. ................ | 303/21 |
| 3,433,535 | 3/1969 | Horvath ........................ | 303/21 |
| 3,441,320 | 4/1969 | Flory ............................ | 303/21 |

*Primary Examiner*—Milton Buchler
*Assistant Examiner*—John J. McLaughlin
*Attorney*—Harness, Dickey & Pierce ABSTRACT: A skid control system for a wheeled vehicle having a plurality of wheels and a brake system for the wheels with the brake of at least one of the wheels being relieved upon the detection of an incipient skid condition and being reapplied when the spin-up or acceleration rate of that wheel is a maximum.

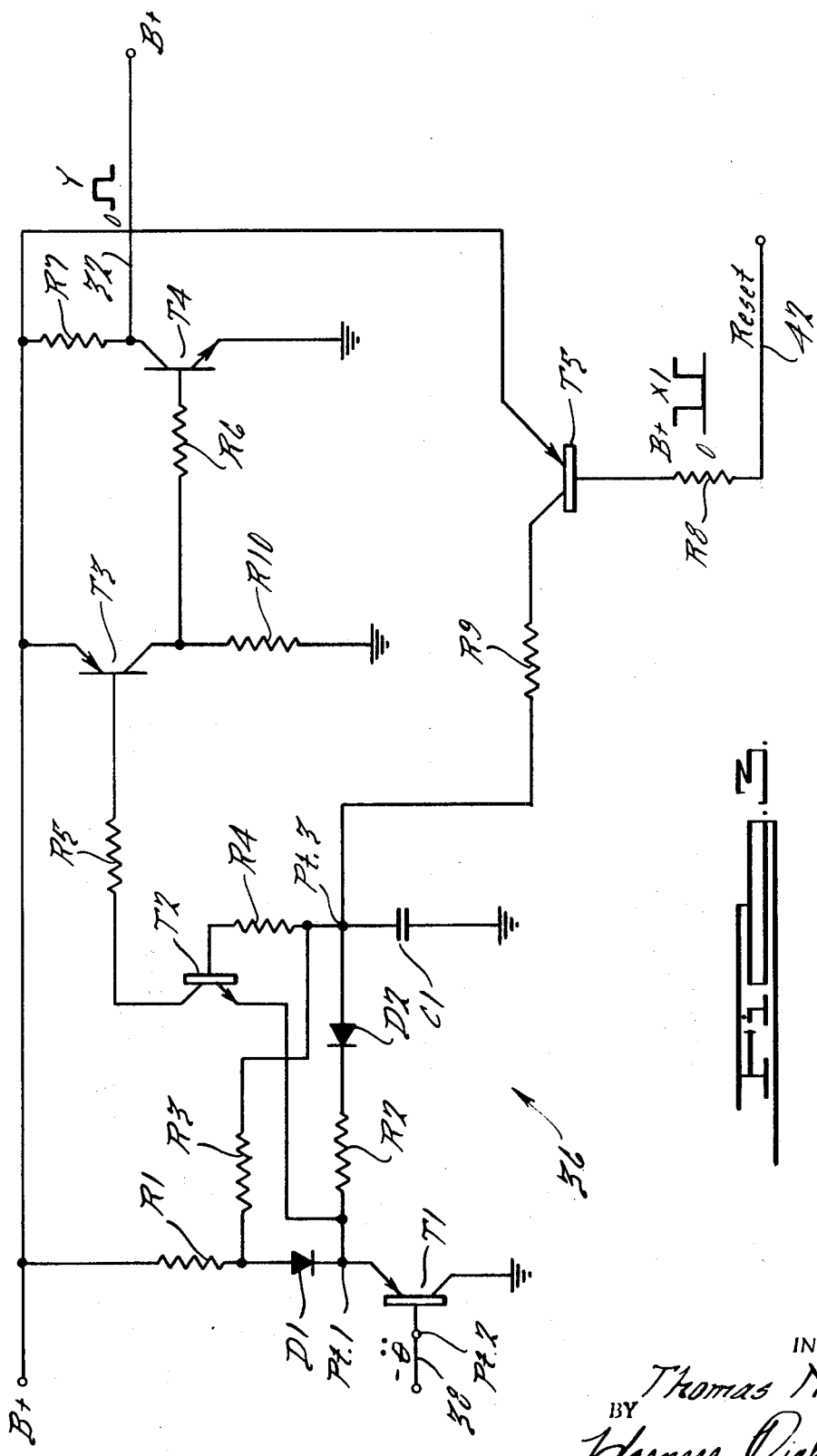

3,604,760

SKID CONTROL SYSTEM

SUMMARY BACKGROUND OF THE INVENTION

The present invention relates to skid control systems and more particularly to a skid control system relieving the brake to a controlled wheel upon occurrence of an incipient skid condition and reapplying brakes generally at the point of maximum acceleration of that wheel.

To maximize braking force at a wheel the brakes of which have been relieved to prevent lock up it is desirable to reapply the brakes when the braking force is maximum. This occurs approximately at the point where the acceleration of that wheel is a maximum. In the present invention the wheel acceleration is constantly measured and when it reaches a maximum magnitude (i.e. ceases to increase and begins to decrease) the brakes are reapplied. Therefore it is an object of the present invention to provide a skid control system in which the brakes to a wheel are relieved in response to an incipient skid condition and are reapplied when the wheel acceleration reaches a maximum.

It is a general object to provide a skid control system in which the brakes to a wheel are relieved and reapplied to maximize braking force.

It is another general object of the present invention to provide a novel skid control system.

Other objects, features, and advantages of the present invention will become apparent from the subsequent description and the appended claims, taken in conjunction with the accompanying drawings, in which:

FIG. 3 is a schematic diagram of the system of FIG. 1.

Figure 1:
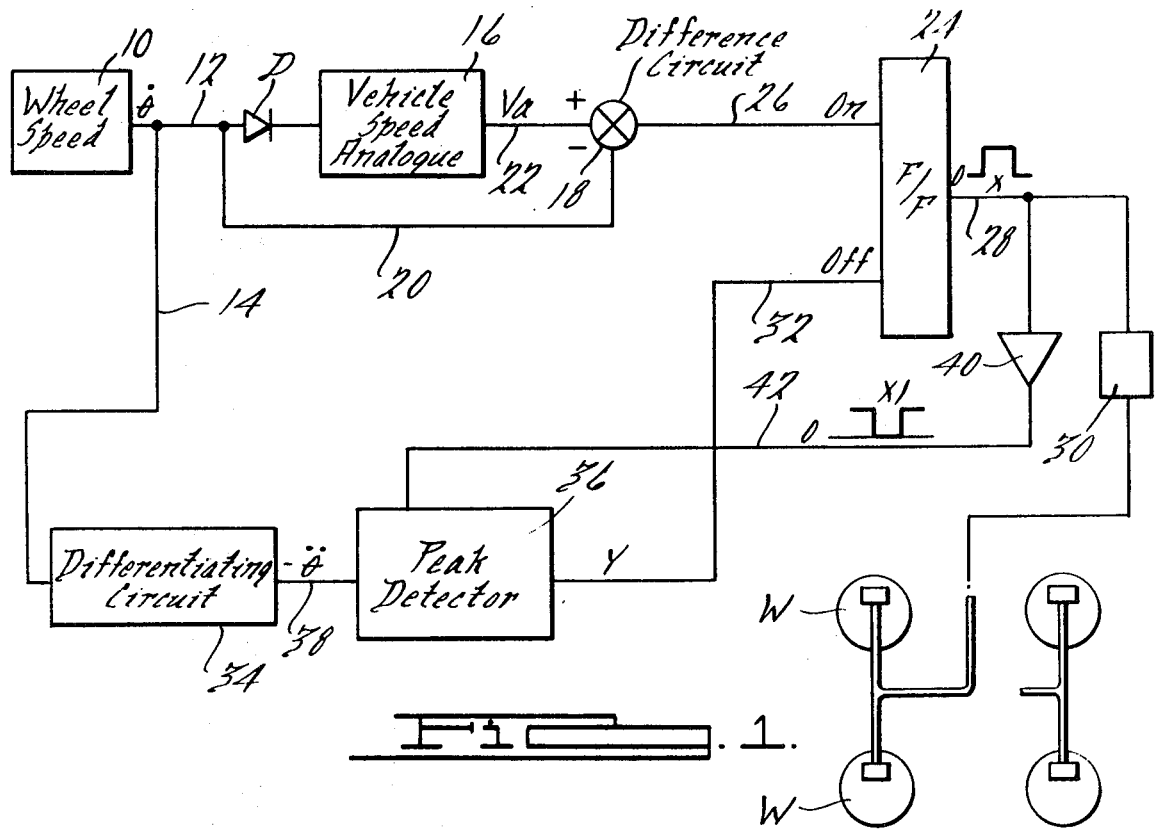
FIG. 1 is a block diagram of one form of the system of the present invention.
Figure 2:
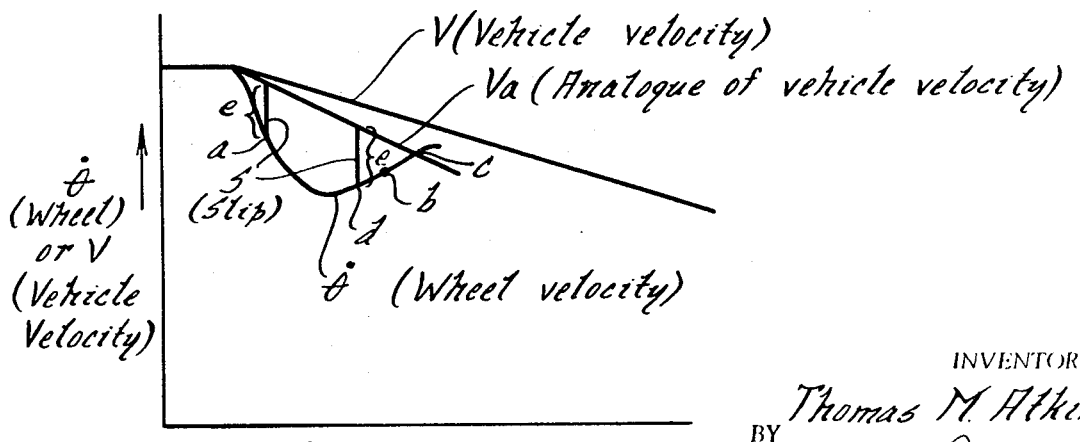
FIG. 2 is a curve depicting operation of the apparatus of FIG. 1.

Looking now to FIG. 2 the relationship of wheel velocity ($\dot{\theta}$) and vehicle velocity (V) versus time is shown for a skid control cycle. Assuming now that the vehicle brakes have been applied the wheel speed $\dot{\theta}$, because of slip S, will fall below vehicle speed V. In one form of the present invention when slip S attains a preselected magnitude (point point a) indicative of excessive breaking and incipient skid a signal will be generated whereby the brakes will be relieved. When the wheel ceases its deceleration and begins to spin up, upon attainment of maximum acceleration (point b) the braking force will be near or at maximum and to maximize retarding force the brakes are reapplied This is done by measuring the wheel acceleration $\ddot{\theta}$ and reapplying the brakes after $\ddot{\theta}$ has reached its maximum magnitude. In the form of the invention shown in FIG. 1 and 3 vehicle speed is approximated and an analogue signal Va provided and slip S is determined relative thereto; i.e. $VA - \dot{\theta} = S$.

The utilization of the maximum value of $\ddot{\theta}$ during spinup to maximize braking force can be realized from the following equation:

$$FR = I\ddot{\theta} + T$$

where,
F is the braking force between the ground and the wheel,
r is the rolling radius of the wheel,
I is the moment of inertia of the wheel,
$\ddot{\theta}$ is the acceleration of the wheel, and
T is the brake torque on the wheel.

The maximum magnitude of braking force F can be determined by differentiating the equation. Since during spinup the brakes or brake pressure has been relieved the brake torque T is near zero or at some substantially constant magnitude and hence its derivative (with respect to time) can be disregarded. Since rolling radius r and moment of inertia I are constant the derivative of the above equation becomes: $Fr = I\ddot{\theta}$; thus the braking forece F will beat its peak or maximum magnitude when the wheel acceleration $\ddot{\theta}$ is at its maximum magnitude. In the system of the present invention $\ddot{\theta}$ is measured and when it ceases to increase and begins to decrease a signal is generated reapplying the brakes.

In FIG. 1 a wheel speed detector 10 provides an output signal $\dot{\theta}$ having and wheel magnitude indicative of the magnitude of one or more wheels W of a vehicle. This signal is transmitted to apparatus for relieving the brakes via conductor 12 and apparatus for reapplying the brake via conductor 14. A vehicle speed analogue circuit 16 provides an output signal Va the magnitude of which simulates vehicle speed V. The analogue circuit 16 receives the wheel speed signal $\dot{\theta}$ via a diode D and as long as the magnitude of $\dot{\theta}$ exceeds Va current will flow through Diode D; hence Va will follow $\dot{\theta}$ in magnitude during nonbraking when vehicle speed and wheel speed are equal. During braking, because of slip, $\dot{\theta}$ will be less than VA and no current will flow through diode D. Analogue circuit 16 will retain the magnitude of $\dot{\theta}$ just prior to braking and is preselected a preselected discharge rate simulating a 1−g deceleration rate such that at any instant the signal Va will have a magnitude representative of the velocity of the vehicle if it were decelerating at 1−g. This, of course, is only an approximation but does provide a convenient means for attaining an instantaneous magnitude of vehicle velocity. The wheel velocity signal $\dot{\theta}$ is also transmitted to a difference circuit 18 via a conductor 20 with the circuit 18 also receiving the analogue signal Va via conductor 22. The difference between signal Va and $\dot{\theta}$ provides an indication of slip S and when the magnitude exceeds a preselected magnitude a flip-flop output circuit 24 will be actuated via conductor 26 to provide output signal X at output conductor 28. The signal X will actuate a brake modulating device 30 which is operative to relieve and reapply pressure to one or more of the brakes of wheels W. The device 30 can be modulating valve of the type shown in the copending U.S. Pat. application of Every et al., Ser. No. 642,861, filed June 1, 1967, and that disclosure is incorporated herein by reference. The flip-flop 24 is constructed such that the actuating signal at conductor 26 is overriding and will maintain flip-flop 24 "on" or conductive regardless of the presence or absence of a signal at its other input 32. Thus, looking to FIG. 2, the brakes cannot be reapplied until the magnitude of slip S decreases to less than the preselected magnitude e which will occur at point d.

As noted, to maximize braking force it is desirable to reapply brake pressure at maximum wheel acceleration, represented by point b in FIG. 2. Thus wheel velocity signal $\dot{\theta}$ is differentiated in differentiation circuit 34 and a signal $\ddot{\theta}$ provided which has a magnitude indicative of the magnitude of rate of change of wheel velocity $\dot{\theta}$. Acceleration signal $\ddot{\theta}$ is transmitted to a peak detector circuit 36 via conductor 38 and is monitored such that an output signal Y will be provided only when signal $\ddot{\theta}$ reaches a maximum and begins to decrease. Signal Y is transmitted to flip-flop 24 via the other input conductor 32 and, assuming no overriding signal is present at the first input conductor 26, signal Y will actuate flip-flop 24 to its nonconductive state whereby signal X will be terminated and device 30 will be actuated to reapply pressure. An amplifier 40 transmits the signal X to peak detector 36 via conductor 42 whereby the detector 36 will reset prior to the initiation of signal X for each cycle. Note that the velocity analogue Va will also be reset each time the wheel velocity curve, $\dot{\theta}$, crosses the vehicle velocity analogue curve Va (point c, FIG. 2) whereby appropriate readjustment will be made whereby Va will more accurately represents actual vehicle speed. The details of the peak detector 36 are shown in FIG. 3.

A PNP transistor T1 is connected as an emitter-follower and has its base positively biased and connected to differentiating circuit 34 whereby it receives the negative of the acceleration signal $-\ddot{\theta}$. T1 has its collector connected to ground and has its emitter connected to B+ via a dropping and isolating diode D1 and a resistor R1. A reference voltage is provided at a capacitor C1 which has one end connected to ground and its opposite end to the emitter of T1 via another dropping and isolating diode D2 and a dropping resistor R2. By means to be described, at the beginning of each skid control cycle, i.e.

prior to initiation of signal X, C1 will be charged to and maintained at approximately B+. Upon initiation of signal X charging of C1 will generally cease and C1 will begin to discharge through the emitter-collector circuit of T1. During acceleration, as spin up increases, $-\ddot{\theta}$ decreases or becomes more negative. With the emitter-follower T1 the potential at the emitter (point 1) will follow the potential at the base (point 2) and will be maintained at a potential approximately one diode drop (emitter-base drop) greater than point 2. As the bias at the base of T1 is decreased with $-\ddot{\theta}$ becoming more negative (increasing acceleration) the potential at point 1 will follow and capacitor C1 will discharge through diode D2 and resistor R2 such that the potential at capacitor C1 (point 3) will be generally one diode drop (diode D2) above point 1. When the wheel acceleration reaches its maximum magnitude the potential at point 3 will have followed the potential at point 1 down to a minimum value. After the maximum wheel acceleration has been attained $-\ddot{\theta}$ will begin to be less negative and the bias at the base (point 2) of T1 will increase and the potential at point 1 will follow. At this time, however, capacitor C1 will have discharged to a potential whereby diode D2 will be back biased and C1 will cease to conduct. In the circuit of FIG. 3 when the potential at point 1 effectively exceeds that at point 3 by a selected magnitude signal Y will be generated; this condition and signal indicates that the maximum wheel acceleration point has just been passed. The resistor Rz is of a relatively low magnitude whereby the discharge time constant for capacitor C1 is short and the potential at point 3 will quickly follow that at points 1 and 2. A resistor R3 is of a relatively large magnitude and is connected from the point 3 to the juncture of diode D1 and resistor R1 to compensate for current leakage from C1 through the base-emitter circuit of T2, which is conductive prior to initiation of signal Y; this aids stability and prevents oscillation.

The difference in potential between points 1 and 3 is sensed by an NPN transistor T2 which has its emitter connected to point 1 and its base connected to point 3 via current-limiting resistor R4. The transistor Tz is normally maintained "on" or conductive and has its collector connected to B+ the base-emitter circuit of PNP transistor T3 via current-limiting resistor R5 connected to the base of T3. T3 has its collector connected to ground via load resistor R10. Thus as long as T2 is conducting T3 will be maintained "on" and when T2 is turned "off" T3 will be turned "off."

Transistor T3 controls NPN type, output transistor T4. T4 has its base connected to collector of T3 via current-limiting resistor R6 and has its emitter connected to ground and its collector connected to B+ via load resistor R7. T4 is normally conductive (when T2 and T3 are conductive) and will be rendered nonconductive when T2 and T3 are rendered nonconductive. Output conductor 32 is connected to the collectors of transistor T4 and will provide output signal Y when T4 is turned "off" which occurs when the potential at point 3 is less than one diode drop above the potential at point 1 indicating that the point of maximum wheel acceleration has just been attained Assuming now that flip-flop 24 has been placed in its off condition signal X and hence signal X1 will be at zero potential and hence the potential at conductor 42 will be zero permitting capacitor C1 to recharged to B+ and turning "on" transistor T2, T3 and T4. This reset is accomplished through PNP transistor T5 which has its base connected to conductor 42 via current-limiting resistor R8; capacitor C1 (and hence point 3) is connected to B+ via the emitter-collector circuit of T5 through a charging resistor R9 connected from the collector to C1. When the flip-flop 24 is "off" the potential at the base of T5 (signal X1 at zero) is at Zero potential and T5 will conduct to rapidly charge C1 to B+ and turn T2, T3 and T4 on. At the initiation of a skid control cycle when flip-flop 24 is turned on signal X1 will place the base of T5 at B+, turning T5 off and terminating charge current to C1. C1 will then discharge in the manner previously described to provide an indication of when maximum wheel acceleration has been attained ant to provide signal Y to turn flip-flop 24 off. Note that flip-flop 24 is provided with a timing circuit such that a preselected time after cessation of the "on" at conductor 26 if no "off" signal Y has been received flip-flop 24 will be turned "off."

The specific details of the apparatus and circuit, other than that of peak detectors 36, do not constitute a part of the present invention and are within the purview of one skilled in the art and have been omitted for the purpose of simplicity.

While it will be apparent that the preferred embodiments of the invention disclosed are well calculated to fulfill the objects above stated, it will be appreciated that the invention is susceptible to modification, variation charge with departing from the proper scope or fair meaning of the invention.

What is claimed is:

1. A skid control system for a wheeled vehicle having a plurality of wheels and a brake system for at least one of the wheels, said skid control system comprising: modulating means responsive to a first signal for relieving brake actuation and to a second signal for reapplying brake actuation for said at least one of the wheels, first means responsive to occurrence of an incipient skid condition at said at least one of the wheels for providing said first signal, and second means responsive to attainment of maximum acceleration of said at least one of the wheels after brake relief for providing said second signal, said second means including sensing means for sensing the amplitude of acceleration of said at least one of the wheels and for providing said second signal generally at the maximum amplitude of acceleration.

2. The system of claim 1 with said sensing means providing said second signal after the amplitude of acceleration has attained and decreased from the maximum amplitude by a preselected amount.

3. The system of claim 2 with said sensing means comprising a capacitor with the magnitude of charge of said capacitor providing an indication of the maximum amplitude of acceleration.

4. The system of claim 3 with said sensing means further comprising an emitter-follower transistor circuit electrically connected to said capacitor for affecting said magnitude of charge.

5. The system of claim 4 with said second means comprising resetting means for resetting the charge on said capacitor prior to initiation of said first signal.

6. The system of claim 1 with said first means including wheel speed means for providing a wheel speed signal indicative of the speed of said at least one of the wheels and slip means for providing a slip signal indicative of the slip between the vehicle and said at least one of the wheels, and output means for providing said first signal when said slip signal attains a magnitude indicative of a preselected amount of slip.

7. The system of claim 6 with said modulating means providing brake relief as long as said first signal is provided.

8. The system of claim 7 with said slip means providing a vehicle speed signal as an analogue of vehicle speed in response to said wheel speed signal based upon a preselected deceleration rate whereby vehicle speed is approximated by decreasing said wheel speed signal at said preselected rate, and including means for comparing said wheel speed signal and said vehicle speed signal for providing said slip signal.

9. The system of claim 8 with said sensing means providing said second signal after the amplitude of acceleration has attained and decreased from the maximum amplitude by a preselected amount.

10. The system of claim 9 with said sensing means comprising a capacitor with the magnitude of charge of said capacitor providing an indication of the maximum amplitude of acceleration.

11. The system of claim 10 with said sensing means further comprising an emitter-follower transistor circuit electrically connected to said capacitor for affecting said magnitude of charge.

12. The system of claim 11 with said second means comprising resetting means for resetting the charge on said capacitor prior to initiation of said first signal.

UNITED STATES PATENT OFFICE
CERTIFICATE OF CORRECTION

Patent No. 3,604,760          Dated September 14, 1971

Inventor(s) Thomas M. Atkins

It is certified that error appears in the above-identified patent and that said Letters Patent are hereby corrected as shown below:

Column 1, line 43, delete "point"
Column 1, line 73, delete "forece" and substitute therefor --force--
Column 2, line 4, delete "and wheel" and substitute --a--
Column 2, line 16, delete "VA" and substitute therefor --Va--
Column 2, line 17, delete "preselected" first occurrence and
  substitute therefor --provided--
Column 2, line 57, after "reapply" insert --brake--
Column 2, line 59, after "will" insert --be--
Column 2, line 73, after "end" insert --connected--
Column 3, line 26, delete "Rz" and substitute therefor --R2--
Column 3, line 39, delete "Tz" and substitute therefor --T1--
Column 3, line 40, after "B+" insert --via--
Column 3, line 75, delete "ant" and substitute therefor --and--
Column 4, line 2, after "on" insert --signal--
Column 4, line 12, delete "charge with" and substitute therefor
  --and change without--

Signed and sealed this 14th day of March 1972.

(SEAL)
Attest:

EDWARD M. FLETCHER, JR.
Attesting Officer

ROBERT GOTTSCHALK
Commissioner of Patents